(12) United States Patent
Wright et al.

(10) Patent No.: US 8,581,716 B2
(45) Date of Patent: Nov. 12, 2013

(54) VEHICLE CRASH HAZARD NOTICE SYSTEM

(76) Inventors: Michael Wright, Beaverton, OR (US);
Debra Wright, Beaverton, OR (US);
Wayne Wright, Oregon City, OR (US)

( * ) Notice: Subject to any disclaimer, the term of this patent is extended or adjusted under 35 U.S.C. 154(b) by 247 days.

(21) Appl. No.: 13/199,905

(22) Filed: Sep. 12, 2011

(65) Prior Publication Data

US 2012/0062373 A1    Mar. 15, 2012

Related U.S. Application Data

(60) Provisional application No. 61/403,219, filed on Sep. 13, 2010.

(51) Int. Cl.
*B60Q 1/00* (2006.01)
*G08B 5/40* (2006.01)

(52) U.S. Cl.
USPC .......................... 340/436; 340/438; 116/214

(58) Field of Classification Search
USPC .................................................. 340/436, 438
See application file for complete search history.

(56) References Cited

U.S. PATENT DOCUMENTS

| | | | |
|---|---|---|---|
| 1,043,228 A | 11/1912 | Harrington et al. | |
| 2,532,901 A | 12/1950 | Glynn | |
| 5,979,328 A | 11/1999 | Rodrigues | |
| 6,668,963 B2 | 12/2003 | Nada | |
| 1,668,049 A1 | 1/2007 | Wright et al. | |
| 7,350,802 B2 | 4/2008 | Yatagai et al. | |
| 2005/0030224 A1* | 2/2005 | Koch | 342/357.07 |
| 2012/0258581 A1* | 10/2012 | Brown et al. | 438/478 |

* cited by examiner

*Primary Examiner* — Steven Lim
*Assistant Examiner* — Omeed Alizada
(74) *Attorney, Agent, or Firm* — Robert J. Ireland

(57) ABSTRACT

An apparatus and method for deploying vivid notice to a first responder, wherein the deploying event is triggered by the vehicle crash motion or by signal from the vehicle's own crash detection system, and the vivid notice is coded to the particular hazard present at the vehicle crash site and includes at least one visual notice, auditory notice, or olfactory notice, and may include a combination of any of the three notices, or all three at once.

6 Claims, 3 Drawing Sheets

VEHICLE CRASH HAZARD NOTICE SYSTEM

CROSS REFERENCE TO RELATED APPLICATIONS

Provisional Application 61/403,219

STATEMENT REGARDING FEDERALLY SPONSORED RESEARCH OR DEVELOPMENT

This invention is not the product of any Federally Sponsored Research or Development.

REFERENCE TO MICROFICHE APPENDIX

Not Applicable

BACKGROUND OF THE INVENTION

1. Technical Field

The present invention relates to an alert system that provides notice of the potential hazards of a vehicle that has been crashed.

2. Discussion of Related Art

Electric, hybrid, gasoline, and diesel vehicles all travel the same roads together, each with a different set of hazards arising upon serious impact or crash. A diesel vehicle has high pressure fuel lines and a store of diesel fuel that must be considered when a first responder addresses the crash site. A gas vehicle is similar to a diesel, but the gas and gas ethanol blends have a much lower flash point than diesel, making spilled fuel a much higher hazard than spilled diesel. Hybrid vehicles have a combination hazard arising from fuel and electric shock. Electric vehicles have the hazards of electric shock and hazards arising from the batteries that store dangerous amounts of electrical power potential. With the different types of vehicles on the road, there are different types of hazards and combination of hazards that become present when vehicles are damaged in major crashes.

First responders such as fire fighters, paramedics, and police are all trained in the proper way to respond to the dangers of a vehicle crash site. Dangers such as fuels like gas and diesel, batteries like hydrogen and sulfuric, and the hidden silent dangers of electrocution by completing a circuit of high power electricity. A pre-warning notice as to these types of dangers at a crash site may be obvious, such as the smell of spilt gasoline. Less obvious notices like a "Hybrid" trim badge on a fender could be easily missed, thereby exposing the responder to the hidden dangers associated with the storage of massive electric charge in the batteries.

To combat the problem of little to no warning of electric shock, responders are taught to recognize the type of vehicle and proceed with the type of cautions that pertain to the type of vehicle. Bad weather, low-light, and exigent circumstances all work against pre-detection by the first responder of the hazards present.

The prior art fails to teach a specific marking or noticing alert system specific to identifying the type of hazard present at a crash site. Air bags deploy when the impact triggers the crash response system, but presently all air bags are of a non-descript color shape, and pattern.

Hybrid and electric vehicles have trim badges and unique model shapes identifying themselves as a potential electrical hazard, but nothing deploys upon serious crash that would warn a first responder of the hidden electrical dangers. Power cables are usually color coded "Red" or "Orange" thereby providing a visual clue that the cable inside may be charge with dangerous electric potential. The 'passive' noticing by color on the power cables, or model badging on the fender falls significantly short of providing adequate notice of certain hazards. In short, once a vehicle is crashed, there is nothing that deploys that identifies the specific type of hazards that are present.

Manufacturers of electric vehicles have determined that due to their silent operation, they pose a special threat to the visually impaired. Auditory tones or noises are added to some makes and models to provide an auditory warning that the vehicle is present when it comes to a stop or begins moving. Manufacturers understand there are hidden risks associated with electric vehicles in use, when maintained, and when crashed, but to date, nothing has been done to forewarn the first responder of the types of silent dangers present at a crash scene.

The prior art does provide teachings related to a high voltage cut-off that enacts upon impact collision, thereby cutting off the electrical power to the motor to decrease the chances of fire or electrocution. The cut off technology eliminates the power to particular parts of the vehicle, while leaving the hidden dangers of high voltage at the battery and the chemical or explosive potential of the batteries themselves. The voltage cut off does not indicate to a first responder that an electrical hazard exists, as there is no visual or auditory announcement that the electric potential is present.

Colored air bags in water craft technologies have suggested but not taught the potential of flagging an accident scene. Presently there is no use of colored or specially marked air bags to designate unique or special safety hazards for crashed vehicles.

There is a need for an early warning system to alert responders to the nature of special hazards at a crash site. If no special hazards are present, then the responder may expedite the rescue effort, and not be slowed down by looking at fender badging. If there is an early warning of electrical potential, the responder would deploy with the specialized equipment necessary to address the crash site. The prior art does not teach a system or method that immediately upon vehicle crash impact, indicates what type of hazard is then present at the emergency site. Further, the prior art fails to teach a system that may be implemented on existing vehicles that would indicate any special safety hazards present upon serious crash.

OBJECTS AND ADVANTAGES a. Visual indicator that the vehicle in the crash has a specific dangerous potential.

b. Auditory indicator that the vehicle in the crash has a specific dangerous potential.

c. Visual/Auditory indicator triggered by existing crash detection system.

d. Crash detection system that deploys visual and/or auditory indication of the specific dangerous potentials of the crashed vehicle.

e. A simple and inexpensive early warning system that will expedite crash response while protecting the first responder.

Still further objects and advantages will become apparent from consideration of the following description and drawing. The above are merely a few objects and advantages provided for by the present invention.

BACKGROUND OF CURRENT INVENTION

Research and development efforts expended by Applicants in the pursuit of making vehicle crash sights safer have resulted in the apparatus and method disclosed herein. The current invention provides a specific notice of the potential hazard of the crashed vehicle. The notice may be auditory or visual, or both, depending on the particular vehicle hazard. Indication is triggered upon crash, either by a stand-alone detection system or by integration into the existing vehicle crash detection system. Once triggered, the particular indication for the particular hazard provides critical pre-warning for the first responder before she enters the crash site.

For example a gas or diesel vehicle is involved in an accident. For a gas or diesel vehicle the notice would be that matching the threat of fuel fire, not electrical or hydrogen battery. The first responder on the scene would be apprised of the situation that the vehicle involved are not electrical, do not have large capacity batteries, and that fuel fire is the specific hazard to work around. Critical first moments of emergency response would not be wasted in determining what type of vehicle was in the crash, as the present invention would have provided that important information immediately and before the responder came within range of the hazard.

In the circumstance that an electric vehicle is damaged in a crash, the present invention immediately indicates the type of hazard, i.e. electric shock, thereby forewarning the first responder. The first responder can then modify her approach to the crash scene, bringing with her the specialized equipment that insulates a responder from electrocution.

Pre-notifying the first responder of the posing hazards of a crashed vehicle allow for quicker care to the injured persons at less risk to the first responder. For example, if the first responder is presented with green confetti and dye at the accident scene indicating no electrical hazard and no hydrogen battery risk, the approach to handling the matter is simplified and moments of critical time are not lost. If red/orange dye or confetti are present indicating high powered electrical charges, the first responder approaches with specialized equipment following the specific training procedures relating to the specific hazard.

DESCRIPTION OF INVENTION

Figure 1:
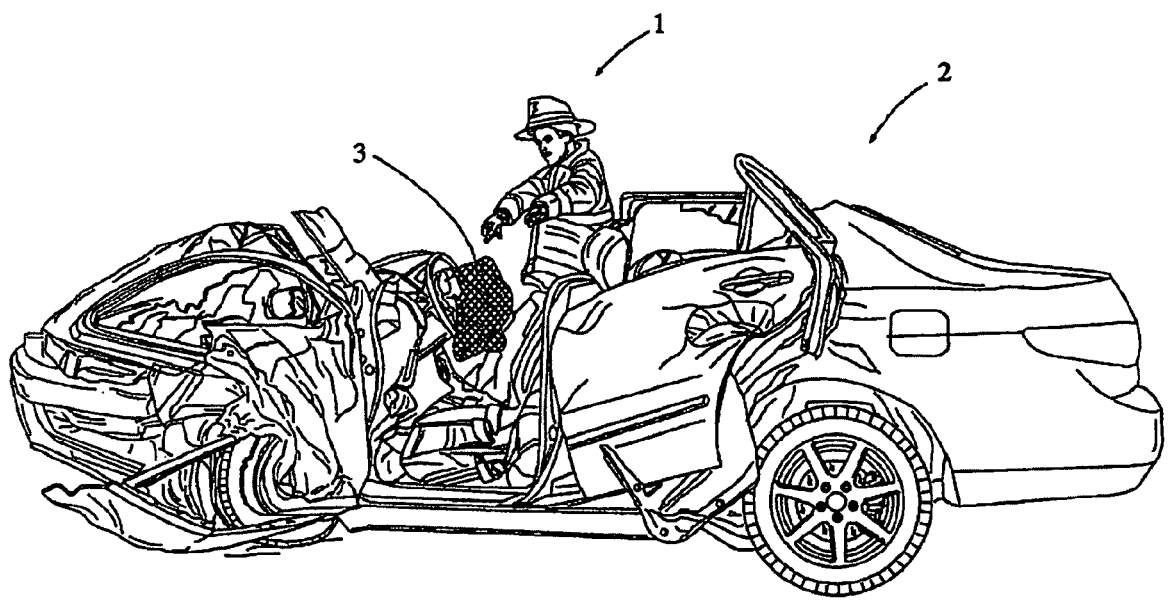
FIG. 1 is a side view of a car of the prior art showing deployed airbags and a first responder on the scene after a crash.

The preferred embodiment deploys vivid notice to the first responder that there is a particular hazard present at the crash scene. In FIG. 1 displays the prior art where the first responder 1, sees the air bag deployed 3, and the severely crashed vehicle 2, but without further elaboration in the form of coded sensory input as described below, the first responder 1 is not forewarned of potential dangers.

Figure 2:
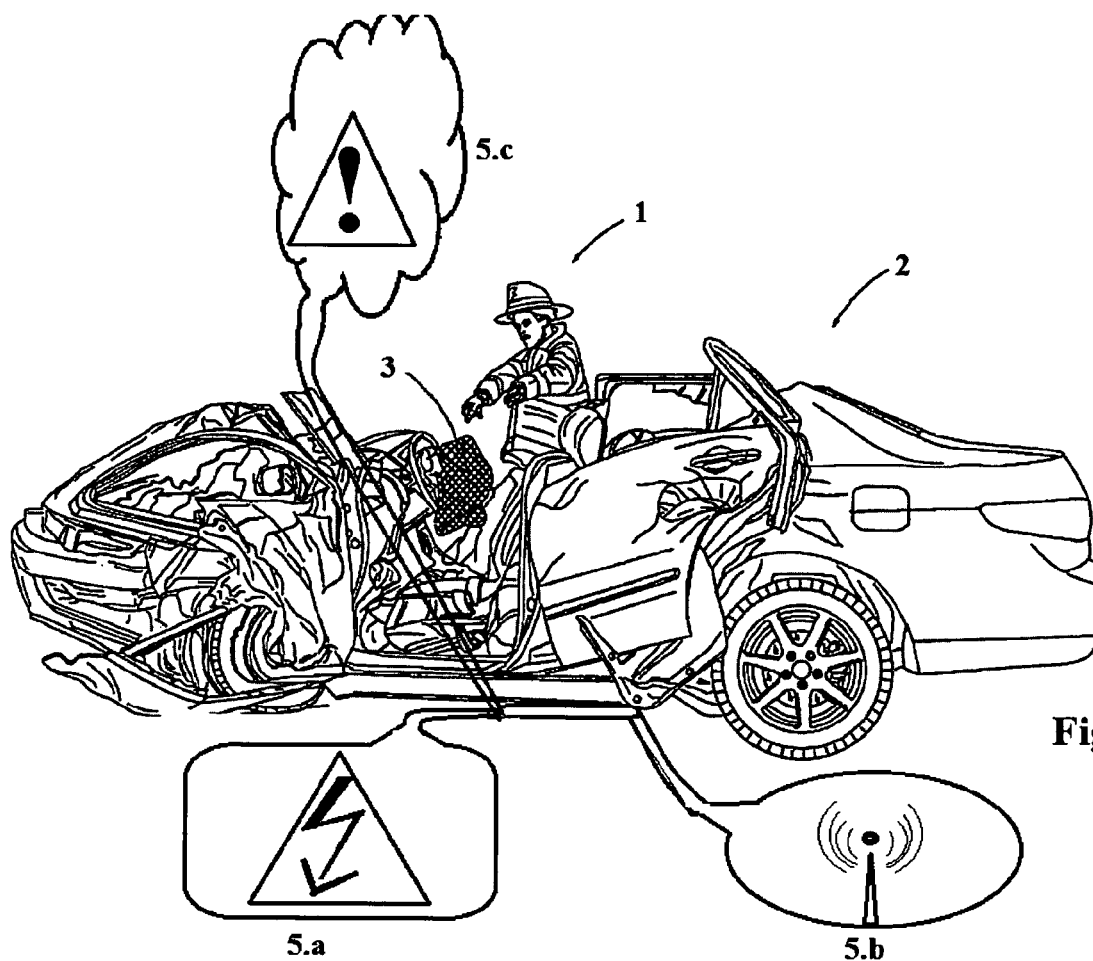
FIG. 2 is a side view of a car showing the preferred embodiment indicating potential hazard by provided vivid notice by visual notice, auditory notice, and olfactory notice

FIG. 2 demonstrates the preferred embodiment wherein the first responder 1 is provided vivid notice by visual notice 5.a, auditory notice 5.b, and olfactory notice 5.c. all coming from the deployment device 4 located under the car. Notice of a hazard communicated through multiple sensory inputs provide pre-warning and early identification of potential hazards. The three target sensory inputs for this invention are the eyes, the ears, and the nose of the first responder.

The eyes are attracted to contrasting and bright colors displayed in significant size. Colors and contrasting colors, even fluorescents, provide universal indicators of certain risks or dangers. A red sign in most countries means stop, a fluorescent orange sign may mean construction, and a green light usually means go. The colors develop secondary meaning, and a universal means to communicate. In FIG. 2 the symbol for electrical hazard is shown as a visual notice 5.a. The visual notice 5.a may be further enhanced by the inclusion of a blinking LED, or other light producing device that would draw further attention to the visual notice 5.a.

The ears continuously perceive sound, and a distinctive sound in repetition like a fire alarm indicates a warning to the listener. Certain sirens provide universal warning of emergency vehicles approaching. The sound develops a secondary meaning to the listener which then provides an early notice of a hazard. In FIG. 2 the diagrammatic symbol for sound is presented as an auditory notice 5.b. The auditory notice 5.b. may be generated by a high frequency chirping piezzo, or a dominating horn, so long as the noise as perceived by the first responder 1 is understood to represent a particular crashed vehicle 2 hazard.

The nose perceives smell, which is used in other fields of art as an early warning notice. For example, propane gas does not have a strong natural odor, is invisible, and usually is not heard while leaking in small volumes, therefore a leak would be undetected. Therefore, a strong sulfuric rotten egg smell is added to all propane gas for the sole purpose of providing an early warning of a gas leak, using the nose as the sensory input. The olfactory notice 5.c may be implemented through scent oils or scent powders combined with the visual notice 5.a. For example, if the visual notice 5.a is a self projecting device like an air bag 3, the propellant may be enhanced through scent adding compositions like peppermint oil that would further indicate information to the first responder 1 of a particular danger. Training as to the particular meaning of a scent, sound, or visual warning will be necessary to maximize applicants' device.

The following examples provide methods of providing the first responder with vivid notice to one sensory input, or a combination of sensor inputs:

For example of a visual notice 5.a as implemented, the color fluorescent green is color code for the common hazards of ordinary gasoline or diesel fuel cars, fluorescent orange (or red) for the high voltage hazards of electric or hybrid-electric cars, and fluorescent sky blue for the explosive hazards of hydrogen and LPG fuels. The color code can be extended to include any other types or combinations of hazard types, and the color indicators can be of any combination. To compliment the visual notice 5.a, the smell of burnt plastic could emanate from a vehicle that presents an electric shock hazard from the olfactory notice 5.c. Or the smell of sulfur and rotten eggs for LPG fueled vehicles. The smell code can be extended to include any and all types of hazards and combination of hazards. The auditory notice 5.b may include a robotic voice stating "Electric Shock Hazard" followed by a siren is blasted at significant volume when the crash system for an electric car is activated, thereby activating the deployment method 4. A code of sounds as applied to hazards is extendable to all types of hazards utilizing any distinguishable sound pattern.

One of the most effective embodiments may for example include the smell of burning plastic (olfactory notice 5.c), with a blinking LED beacon of red light (visual notice 5.a), having a siren blasting high pitched chirps (auditory notice 5.b), with all three indicators consistently noticing the hazard of electric shock present at the crash site, thereby giving unequivocal notice to the first responder 1 of the potential hazards of the crashed vehicle 2.

Figure 3:
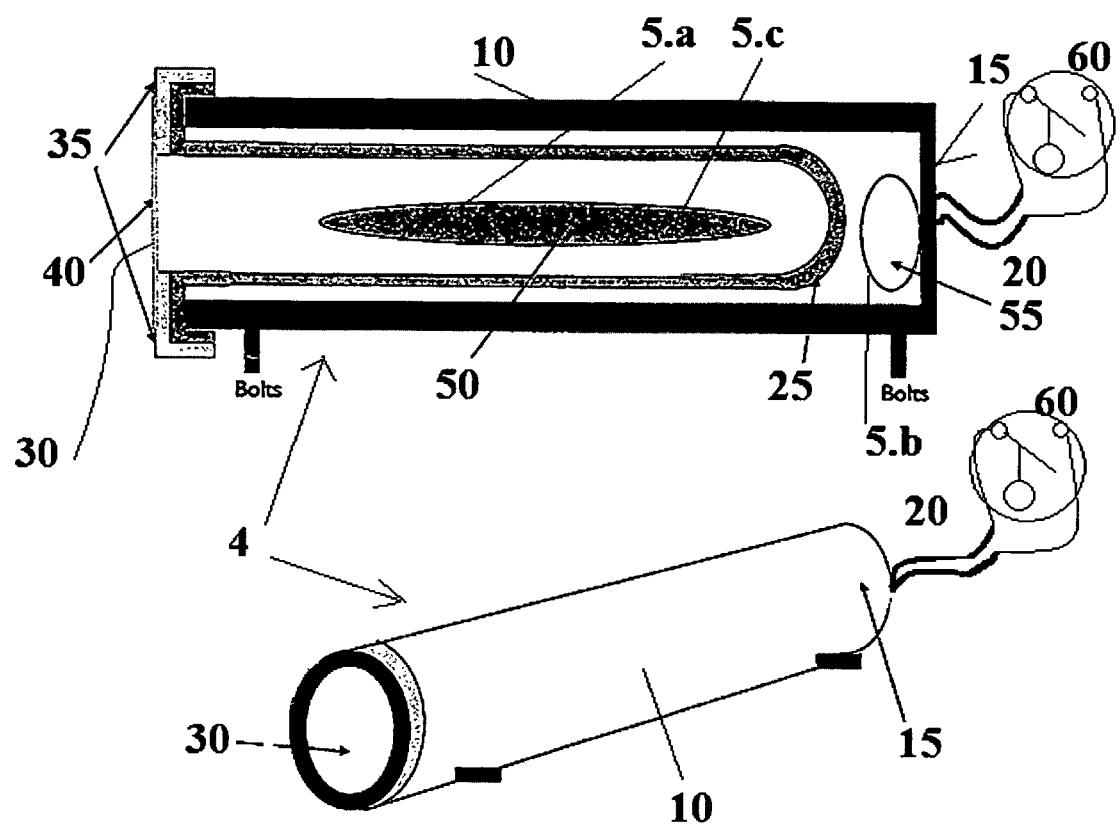
FIG. 3 illustrates one possible configuration of one preferred embodiment utilizing existing air bag technology as a deployment method of the invention.

The vivid notice must be contained until deployed, and only deployed upon vehicle crash. The deployment method would be appropriate for either new vehicles or for aftermarket installation. As shown in FIG. 3, a cylinder receives the vivid notice method, which for this one embodiment, may be colored powder, confetti, streamers, LEDs, auditory sirens, or any other apparatus or materials capable of noticing the first responder's senses.

The deployed vivid notice method may include strong smelling powders that when released, combine with available moisture in the air to make for scent coded warning. Small or large blinking LEDs may be integrated with streamers or confetti thereby providing visual warning either in the daytime or at night. The confetti and/or streamers of coded color will further warn and inform the first responder of the hazard situation.

The vivid notice method may be of any coded combination of visual, auditory, or smell indicators. The deployment apparatus may be of any self releasing containment structure capable of containment of the vivid notice method until deployment.

Upon crash, the preferred embodiment either senses impact directly by mercury motion switch or some other commercially available crash sensor, or is triggered by the vehicle's own crash detection system. For example, a pressure switch installed in pressure communication with the air bag containment area provides immediate signal that the air bag has been fired, thereby triggering the deployment method 4 to release whatever vivid notice method is loaded within without affecting the factory installed air bag deployment system.

FIG. 3 illustrates a preferred embodiment using existing air bag technology, and is disclosed only as one possible configuration. Using the vehicle's existing air bag 3 deployment as a trigger for the vivid noticing deployment device 4 allows easy install and reliable use. The vehicle's "Airbag control unit" (ACU) monitors a number of related sensors within the vehicle, including accelerometers, impact sensors, side (door) pressure sensors, wheel speed sensors, gyroscopes, brake pressure sensors, and seat occupancy sensors. When the requisite 'crash threshold' conditions have been reached or exceeded, the airbag control unit will trigger the ignition of a gas generator propellant to rapidly inflate a nylon fabric bag pre-impact of the occupant, which provides a safe cushion for which the occupant impacts rather than hitting a hard steering wheel.

This rapid vehicle air bag deployment is easily sensed by a commercially available pressure switch 60 like the PSD 25 Prosense pressure switch as located in pressure communication with the vehicle's air bag deployment area, and when the air bag of the vehicle deploys, the pressure switch 60 goes from open, not conducting, to closed when the pressure is sensed, thereby providing power to the deployment device 4. The pressure switch 60 is inherently slow when compared to the speed of crash sensing technology of the vehicle air bag system 3, which is beneficial in the preferred embodiment as the built in delay triggers applicants' device after the crash event. Of note, the pressure switch 60 needs to be sensitive enough to be triggered by an air bag deployment but not too sensitive which would make it susceptible to misfiring when a door is slammed shut.

The deployment of the visual notice 5.*a* and olfactory notice 5.*c* for the preferred embodiment uses the same ignition method of a gas generator propellant as does the standard vehicle air bag. When ignited, the gas propellant 55 clears the cylinder 10 of obstruction which includes the visual notice 5.*a* and the olfactory notice 5.*c*, putting the auditory notice 5.*b* component in sound communication to the space around the vehicle. The standard air bag device makes for an excellent deployment component as it is readily available, inexpensive, and safe to deploy within, under, or on top of a vehicle.

The cylinder 10, is a plastic tube with one end closed 15 with a small hole where the conductors 20 pass through to provide the energy to trigger the deployment. The open end 30 of the cylinder 10 has the open end 30 of the airbag 25 tightly fitted to the cylinder 10.

The air bag 25 is held in place by the press fit molding 35 squeezed around it and driven back against the open end 30. Visual notice 5.*a* may include confetti or a colored nylon bag (similar to the common air bag) with the designating hazard symbol permanently affixed directly on the bag 25. Olfactory notice 5.*c* is accomplished through the use of scented oils saturated into the air bag 25 material and contained until deployment. The gas propellant 55 is located on the closed end 15, in signal connection with the pressure switch 60 via the conductors 20. The pressure switch 60 is located in pressure communication with the vehicle's air bag 3 shown in FIG. 1 such that pressures from the vehicle air bag 3 trigger the deployment of the vivid noticing deployment device 4.

The auditory notice 5.*b* is preferably powered by the same power required to ignite the propellant 55, which allows the pressure switch 60 when in the closed position to ignite the propellant 55 and power the auditory notice 5.*b*. The auditory notice 5.*b* in the preferred embodiment is accomplished by the MG100 which is an excellent sounder as it has a 3 to 28 VDC range of allowable powering voltages. The MG 100 provides a continuous tone siren that is different than other sounds usually present at a vehicle crash scene. In the preferred embodiment, the conductors 20 provide power to both the auditory notice 5.*b*, and the ignition of the gas generator propellant 55. The gas generator propellant 55 is the same as the standard air bag, requiring two conductors that when powered ignite the propellant. The auditory notice 5.*b* component is contained within the cylinder 10, and only becomes exposed to the elements after the deployment device 4 is triggered. Until deployment, the visual notice 5.*a*, auditory notice 5.*b* and olfactory notice 5.*c* are located within the cylinder 10, sealed away from the elements, ready for deployment.

A light protective cover of durable plastic or of sturdy waxed paper 40 is secured by adhesive or other mechanical fixation to the open end 30 of the cylinder 10. This cover is strong and durable enough to last for the life time of the vehicle, but it is light enough not to interfere with the deployment of the visual notice 5.*a*, auditory notice 5.*b* and olfactory notice 5.*c* as triggered by an pressure sensor 60.

As the present invention has been described above with reference to at least one preferred embodiment, modification and variance of the vivid notice method or deployment apparatus can be performed with the result still falling within the scope of the disclosed invention. Absolutely no limitation is intended or inferred with respect to the specific embodiments and examples disclosed herein. Each method and apparatus described as an embodiment or example has a plethora of equivalents.

What is claimed is:

1. A post-impact vehicle crash hazard notice system, comprising:
   an enclosure mountable to a vehicle, constructed and arranged to contain an enhanced propellant having scent adding compositions indicative of a type of particular vehicle crash hazard, the enclosure having at least one conductor wire passing through the enclosure; and a switch conductively connected between electrical power and the one conductor wire such that when the air bag deploys, the switch closes thereby igniting the propellant and thus deploying an olfactory hazard notice for the type of particular vehicle crash hazard.

2. A post-impact vehicle crash hazard notice system, comprising:

a scent adding composition indicative of a type of particular vehicle crash hazard contained within or around a vehicle's air bag such that upon air bag deployment an olfactory hazard notice is released for the type of particular vehicle crash hazard.

3. A post-impact vehicle crash hazard notice system, comprising:

an enhanced air bag propellant having a scent adding composition indicative of a type of particular vehicle crash hazard such that upon air bag deployment an olfactory hazard notice is released for the type of particular vehicle crash hazard.

4. A post-impact vehicle crash hazard notice system, according to claim 1, 2 or 3, further comprising an enhanced visual sign indicative of a type of particular vehicle crash hazard that deploys in complimentary cooperation with the olfactory hazard notice.

5. A post-impact vehicle crash hazard notice system, according to claim 1, 2 or 3, further comprising an enhanced auditory sign indicative of a type of particular vehicle crash hazard that deploys in complimentary cooperation with the olfactory hazard notice.

6. A post-impact vehicle crash hazard notice system, according to claim 1, 2 or 3, further comprising an enhanced visual sign and enhanced auditory sign, both indicative of a type of particular vehicle crash hazard that deploy in complimentary cooperation with the olfactory hazard notice.

\* \* \* \* \*